March 15, 1927.
R. HEAD ET AL
1,621,012
APPARATUS FOR CUTTING SWEETMEATS
Filed Nov. 14 1925
2 Sheets-Sheet 1
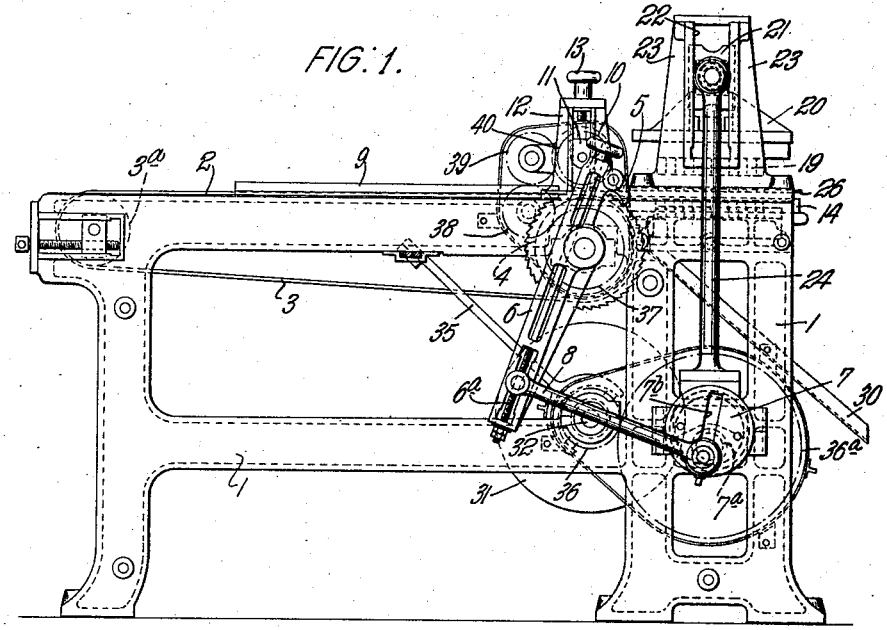
INVENTORS:
Ronald Head,
William Edward Prescott.
ATTORNEY:

March 15, 1927. 1,621,012
R. HEAD ET AL
APPARATUS FOR CUTTING SWEETMEATS
Filed Nov. 14, 1925   2 Sheets-Sheet 2

INVENTORS:
Ronald Head,
William Edward Prescott.
ATTORNEY

Patented Mar. 15, 1927.

1,621,012

UNITED STATES PATENT OFFICE.

RONALD HEAD AND WILLIAM EDWARD PRESCOTT, OF LONDON, ENGLAND, ASSIGNORS TO BAKER PERKINS COMPANY, INCORPORATED, OF WHITE PLAINS, NEW YORK, A CORPORATION OF NEW YORK.

APPARATUS FOR CUTTING SWEETMEATS.

Application filed November 14, 1925, Serial No. 69,107, and in Great Britain December 19, 1924.

This invention relates to apparatus for cutting slabs or blocks of sweetmeats, such as toffee or caramel into squares, diamonds, or other substantially similar pieces involving the use of a knife or knives, bent transversely after the manner of the teeth of a saw so as to form a zigzag cutting edge, which, at each stroke of said knife, will cut a zigzag line across the material, and the principal object of the present invention is to so arrange said knife or knives that the cutting edge or edges will lie or act diagonally across the slab of sweetmeat which is fed thereto, so that at each stroke the pieces are cut without laterally shifting either the knife or the slab as was necessary in certain prior apparatus for this purpose.

The slab of sweetmeat is intermittently fed on a conveyor over or along a table or the like above which the diagonally disposed knife is mounted for vertical reciprocation, the cutting movements of the knife taking place while the slab is stationary and the slab being preferably subjected to pressure means such as a spring or other loaded roller while the cutting operation is taking place. Such pressure roller is suitably driven with the conveyor and acts to hold the slab firmly during cutting and feed it forward, for example, over a shearing plate or equivalent hereinafter referred to.

After cutting on the table or on the shearing plate the cut pieces are removed as by a delivery chute or conveyor to any required position for packing or to be otherwise dealt with.

Where the cutting takes place in conjunction with a shearing plate this latter will be of sufficient thickness to properly coact with the knife to sever the pieces and its edge will be shaped to correspond with the zigzag edge of the knife, or alternatively both the knife and shearing plate may have their coacting edges divided into two portions substantially at a right angle to one another and extended to form two edges each lying diagonally across half the width of the slab and meeting at the centre.

A scrap or stripper plate, which may be spring loaded, is suitably carried by the usual cross head which supports the knife, or the latter may be arranged to operate through a stationary stripping plate.

Figure 3:
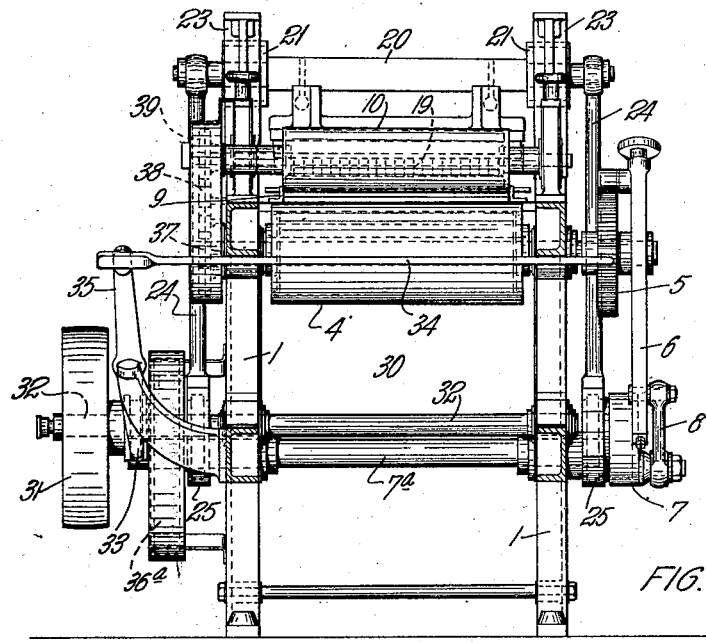
Figures 4, 5:
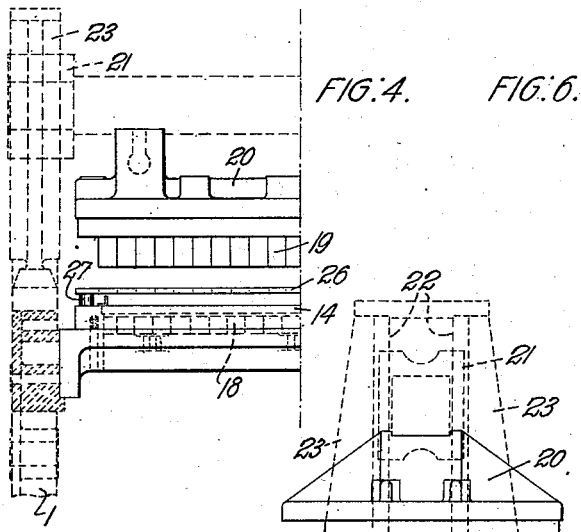
Figure 6:
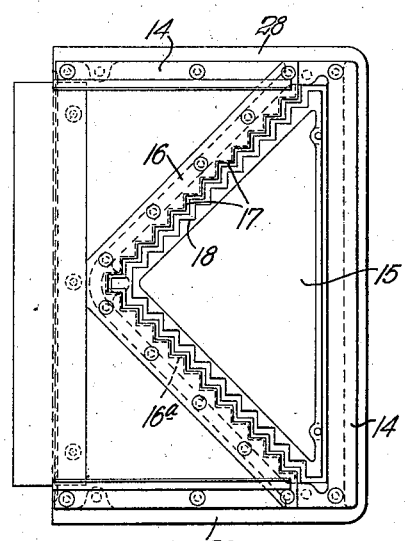

An embodiment of a machine according to the present invention is illustrated in the accompanying drawings, in which Fig. 1 is a side elevation and Fig. 2 a plan view. Fig. 3 is an end elevation from the left of Fig. 1. Fig. 4 is a partial end view of the knife, stripper plate and shearer plate. Fig. 5 is a sectional side elevation of the knife, shearing plate and associated parts; and Fig. 6 a plan view of the shearing plate and cutting table. Figs. 4 to 6 are on a larger scale than Figs. 1 to 3.

The machine illustrated comprises a suitable frame 1, the upper surface of which is plane to form a table 2 over which passes a web or conveyor 3 which is driven intermittently. The conveyor is mounted on rollers $3^a$ and 4, with the latter of which is associated a pawl and ratchet drive gear 5 operated as by means of a slotted arm or lever 6 driven by crank disk 7 on a transverse shaft $7^a$ and connecting rod 8. The latter may be adjusted in the crank disk and arm to vary the stroke of the pawl and ratchet gear.

Above the web 3 are two lateral guides 9 between which the slab of sweetmeat to be cut is placed and by which it is guided to a pressure roller 10 above the web. This roller is mounted in blocks 11, one at each side, slidably mounted in vertical side frame members 12, the blocks being under the action of adjusting screws 13 to vary the pressure of the roller on the slab and provide for different thicknesses of slabs. The slab on the web subjected to the pressure of the roller 10 is fed by the movement of the web and roller to a cutting table 14 shown more particularly in Figs. 5 and 6 as comprising a plate slotted at 15 to have mounted therein a shearing plate 16 having zigzag cutting edges 17 and a similarly shaped plate 18 below same, the purpose of which will be hereinafter explained. Above the cutting table is located the vertically reciprocable knife 19 having also zigzag cutting edges and which is mounted in a cross head 20 carried by blocks 21 slidable in guides 22 in vertical side frame members 23. The blocks 21 are reciprocated in the guides 22 by means of connecting rods 24, one at each side, operated by eccentrics 25 on the same shaft $7^a$ as the crank disc 7.

Between the knife and the shearer plate is provided a stripping member 26 having zigzag apertures through which the knife passes in its downward and upward movements. This plate is shown as carried by studs 27 mounted on the cutting table.

From the above description it will be clear that on the downward movement of the knife the slab fed forward by the web and roller 10 and held against movement by said roller is cut into squares or rectangles by the zigzag edges of the knife co-operating with the similarly shaped edges of the shearing plate 16 and that on upward movement thereof any tendency for the cut portions to adhere to the knife is prevented by the stripping member 26. In the event of the material of which the slab is composed being of a somewhat soft nature and likely to bend in cutting or there being any tendency for the cut pieces to shift or become misplaced after cutting due possibly to the knife and shearing plate not making a perfectly clean cut, the plate 18 previously referred to comes into operation. The shearing plate 16 is undercut or recessed below as at $16^a$ and the plate 18 which also has zigzag edges is adjustably carried by a frame 28 below the cutting table, being mounted on screws or the like 29 so that it can be raised close up to the shearing plate or positioned slightly away from same according to the nature and thickness of the slab being cut. The zigzag edges of said plate form continuations of the zigzag teeth of the shearing plate and tend to prevent any distortion or displacement of the cut pieces under the conditions above stated.

The cut pieces fall down through the cutting table onto an inclined delivery plate 30 or may be otherwise disposed of according to will.

Any convenient mechanism may be used for driving the moving parts. In the embodiment shown power is transmitted by a pulley 31 on a main drive shaft 32 provided with a clutch 33 operated by hand rod 34 and shift lever 35.

From said shaft 32 movement is conveyed through gears 36, $36^a$ to the aforesaid shaft $7^a$ for operating the cutting head and web as previously explained. On the web roller 4 is a gear 37 which drives a train of gearing 38, 39, 40 the latter of which is mounted on the shaft of pressure roller 10 so that the latter is rotated in direction of feed of the slab over the table. The adjustability of connection of the rod 8 may be effected by slotting the crank disc 7 as at $7^b$ and providing a screw adjustment $6^a$ in the arm 6.

What we claim as our invention and desire to secure by Letters Patent of the United States is:—

1. A knife for candy-cutting apparatus, bent transversely to form, in horizontal section, a zigzag line and embodying two coordinate portions which are disposed substantially at right angles to each other.

2. In apparatus for cutting a forwardly-moving slab of candy, a knife bent transversely to form, in horizontal section, a zigzag line and embodying two coordinate portions which are disposed substantially at right angles to each other and which extend diagonally across the path of movement of the candy to meet at the center of such path; and a shearing plate for cooperation with said knife having a zigzag cutting edge disposed in a similar manner to that of the knife.

3. In apparatus for cutting a forwardly-moving slab of candy, a V-shaped knife bent transversely to form, in horizontal section, a zigzag line, said knife having its apex directed toward the line of movement of the candy; means for reciprocating said knife vertically; a cutting table below the knife; a shearing plate mounted in said table for cooperation with said knife and having a V-shaped, zigzag cutting edge disposed in a similar manner to that of the knife; and a stripping member between the knife and the shearing plate and having a V-shaped, zigzag line of apertures through which the knife passes during its vertical movements.

4. In apparatus for cutting a forwardly-moving slab of candy, a V-shaped knife bent transversely to form, in horizontal section, a zigzag line, said knife having its apex directed toward the line of movement of the candy; means for reciprocating said knife vertically; a cutting table below the knife; a shearing plate mounted in said table for co-operation with said knife and having a V-shaped, zigzag cutting edge disposed in a similar manner to that of the knife; and a separate plate mounted in said table below the shearing plate and similar in shape thereto, said separate plate being adjustable vertically toward and from the shearing plate.

5. In apparatus for cutting a forwardly-moving slab of candy, a $V^a$shaped knife bent transversely to form, in horizontal section, a zigzag line, said knife having its apex directed toward the line of movement of the candy; means for reciprocating said knife vertically; a cutting table below the knife; a shearing plate mounted in said table for cooperation with said knife and having a V-shaped, zigzag cutting edge disposed in a similar manner to that of the knife; a separate plate mounted in said table below the shearing plate and similar in shape thereto, said separate plate being adjustable vertically toward and from the shearing plate; and a stripping plate between the knife and the shearing plate and having a V-shaped, zigzag line of apertures through which the knife passes during its vertical movements.

6. In apparatus for cutting a forwardly-moving slab of candy, a knife bent transversely to form, in horizontal section, a zigzag line and embodying two coordinate portions which are disposed substantially at right angles to each other and which extend diagonally across the path of movement of the candy to meet at the center of such path; means for reciprocating said knife vertically; a cutting table for coaction with the knife; and a conveyor for feeding the candy to and across the table.

7. In apparatus for cutting candy and the like, a cutting table; a vertically-reciprocating knife disposed thereover; a conveyor for feeding the candy to and across the table; a presser roller to hold the candy against movement during the cutting operation; a drive shaft; a secondary shaft connected to be driven thereby; means actuated by the secondary shaft for operating said knife; a device actuated by said secondary shaft for intermittently moving the conveyor; and means operated by said conveyor during its feed movements to rotate the presser roller.

8. In apparatus for cutting candy and the like, a cutting table; a vertically-reciprocating knife disposed thereover; a conveyor for feeding the candy to and across the table; a presser roller to hold the candy against movement during the cutting operation; means for operating said knife; means for intermittently moving the conveyor; and means operated by said conveyor during its feed movements to rotate the presser roller.

In witness whereof we have signed this specification.

RONALD HEAD.
WILLIAM EDWARD PRESCOTT.